2,727,039

TERTIARY - AMINOALKYL 4-AMINO-2-HYDROXY-BENZOATES, THEIR SALTS AND PREPARATION THEREOF

Raymond O. Clinton, North Greenbush, and Stanley C. Laskowski, Menands, N. Y., assignors to Sterling Drug Inc., New York, N. Y., a corporation of Delaware No Drawing. Application October 9, 1953,
Serial No. 385,281

20 Claims. (Cl. 260—294.3)

This application relates to tertiary-aminoalkyl esters of 4-amino-2-hydroxybenzoic acid, to water-soluble acid-addition salts thereof, and to the preparation of these new compounds.

We have found that the basic esters of the general formula

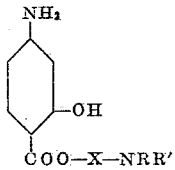

where X is a lower alkylene radical and NRR' is a lower aliphatic-like tertiary-amino radical, exhibit valuable pharmacological properties. These esters, preferably in their form of water-soluble acid-addition salts, have been found to possess outstanding local anesthetic activity. These esters are also useful in that as bases they form salts with penicillin which have a valuable protracted antibiotic activity [Kiel et al., Arzneimittel-Forsch. 1, 326 (1951)].

This application is a continuation-in-part of our application Serial Number 168,841, filed June 17, 1950, now abandoned. Since the filing of our parent application, W. Keil et al. [Arzneimittel-Forsch. 1, 154–6 and 270 (1951); ibid., 2, 112 (1952)] and Grimme and Schmitz [Ber. 84, 734 (1951)] have also described the compounds disclosed and claimed in our said parent and present applications.

In the above general formula, the lower alkylene radical represented by X has preferably 2–4 carbon atoms, and has its two free valence bonds on different carbon atoms. Thus X includes such examples as

—CH$_2$CH$_2$—,    —CH$_2$CH$_2$CH$_2$—,

—CH$_2$CH(CH$_3$)

—CH$_2$CH$_2$CH$_2$CH$_2$—,    —CH$_2$CH(CH$_3$)CH$_2$—,    and the like. The lower aliphatic-like tertiary-amino radical shown above as NRR' comprehends lower dialkylamino radicals where R and R' are lower alkyl groups, alike or different, and each alkyl group having preferably 1–6 carbon atoms, such dialkylamino radicals including dimethylamino, diethylamino, ethylmethylamino, diisopropylamino, di-n-butylamino, di-n-hexylamino and the like. Further, the lower aliphatic-like tertiary-amino radical designated as NRR' encompasses those radicals where R and R' are joined directly or through an oxygen atom to form saturated N-heteromonocyclic radicals having 5–6 ring atoms, illustrated by examples such as 1-piperidyl, 2-methyl-1-piperidyl, 3-ethyl-1-piperidyl, 4-methyl-1-piperidyl, 2,6-dimethyl-1-piperidyl, 1-pyrrolidyl, 2-methyl-1-pyrrolidyl, 2,5-dimethyl-1-pyrrolidyl, 4-morpholinyl, and the like.

The above basic esters are prepared by esterifying 4-nitro-2-hydroxybenzoic acid to produce the tertiary-aminoalkyl 4-nitro-2-hydroxybenzoate having the formula

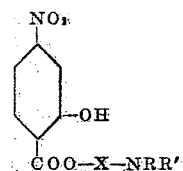

where X and NRR' have the meanings given hereinabove, and reducing said basic 4-nitro-2-hydroxybenzoate to the corresponding tertiary-aminoalkyl 4-amino-2-hydroxybenzoate. A specific illustration of this procedure is the formation of 2-dimethylaminoethyl 4-amino-2-hydroxybenzoate by esterifying 4-nitro-2-hydroxybenzoic acid to produce 2-dimethylaminoethyl 4-nitro-2-hydroxybenzoate and reducing the latter to form 2-dimethylaminoethyl 4-amino-2-hydroxybenzoate. We carried out the esterification of 4-nitro-2-hydroxybenzoic acid to produce the corresponding tertiary-aminoalkyl ester in various ways. In one procedure, the 4-nitro-2-hydroxybenzoic acid was reacted with a tertiary-aminoalkyl halide. In another procedure, a lower alkyl 4-nitro-2-hydroxybenzoate was transesterified with a tertiary-aminoalkanol. In still another procedure, the 4-nitro-2-hydroxybenzoic acid was first treated with a haloalkanol to produce a haloalkyl ester which was reacted with a secondary amine to yield the desired tertiary-aminoalkyl ester. Thus, in the above specific illustration, 2-dimethylaminoethyl 4-nitro-2-hydroxybenzoate is prepared by reacting 4-nitro-2-hydroxybenzoic acid with 2-dimethylaminoethyl chloride; by reacting methyl 4-nitro-2-hydroxybenzoate with 2-dimethylaminoethanol; or by first reacting 4-nitro-2-hydroxybenzoic acid with ethylene chlorohydrin and treating the resulting 2-chloroethyl 4-nitro-2-hydroxybenzoate with dimethylamine.

The reduction of the tertiary-aminoalkyl 4-nitro-2-hydroxybenzoates to the corresponding 4-amino-2-hydroxybenzoates was carried out both by chemical methods and by catalytic hydrogenation. Suitable chemical reducing agents include iron and hydrochloric acid, ferrous sulfate and ammonia, tin and hydrochloric acid, sodium hydrosulfite, etc. Catalysts suitable when catalytic hydrogenation is used include Raney nickel, platinum, palladium, or other catalysts generally effective to catalyze hydrogenation of nitro groups to amino groups.

Our tertiary-aminoalkyl 4-amino-2-hydroxybenzoates are therapeutically active whether employed as the free bases or as their salts with relatively non-toxic organic or inorganic acids. We found it convenient to isolate the basic esters as their hydrochlorides or phosphates. However, other acid-addition salts are within the scope of our invention. Such additional salts include the hydrobromides, sulfates, citrates, sulfamates, tartrates, succinates, acetates, benzoates, oleates, and the like.

Specific embodiments of our invention are illustrated in the following paragraphs:

(1) *Tertiary-aminoalkyl 4-nitro-2-hydroxybenzoates*

These basic esters were prepared from 4-nitro-2-hydroxybenzoic acid by the following esterification variants: by the reaction of 4-nitro-2-hydroxybenzoic acid with a tertiary-aminoalkyl halide; by the reaction of a lower alkyl 4-nitro-2-hydroxybenzoate with a tertiary-aminoalkanol; or by the reaction of 4-nitro-2-hydroxybenzoic acid with a haloalkanol followed by treatment of the resulting haloalkyl ester with a secondary amine.

The first variant is illustrated by the following preparation of 2-diethylaminoethyl 4-nitro-2-hydroxybenzoate hydrochloride: To a stirred refluxing solution of 137.5 g. of 4-nitro-2-hydrobenzoic acid in 800 ml. of isopropanol was added dropwise 110 g. of 2-diethylaminoethyl chloride during the course of one and one-half hours. The resulting heterogeneous mixture was stirred and refluxed for an additional seven hours, cooled, and the dense white precipitate was collected. The filter was evaporated to dryness in vacuo and the resulting residue was triturated with acetone. The acetone-insoluble material was combined with the original precipitate and the material was recrystallized several times from ethanol in the presence of a small amount of anhydrous hydrogen chloride. There was obtained 161.4 g. (67.7%) of 2-diethylaminoethyl 4-nitro-2-hydroxybenzoate hydrochloride, M. P. 179.6–180.4° C. (corr.), crystallizing in white needles.

The second procedure of reacting a lower alkyl 4-nitro-2-hydroxybenzoate with a tertiary-aminoalkanol is illustrated by the following preparation of 3-(2-methyl-1-piperidyl)propyl 4-nitro-2-hydroxybenzoate hydrochloride: A mixture of 84.5 g. of ethyl 2-hydroxy-4-nitrobenzoate, 70.8 g. of 3-(2-methyl-1-piperidyl)propanol, 700 ml. of dry toluene and 200 mg. of sodium methoxide was slowly distilled through an efficient fractionating column. The evolution of ethanol was slow, requiring forty-eight hours for completion. The residue was evaporated in vacuo and the resulting viscous oil was dissolved in ethyl acetate and treated with an excess of ethereal hydrogen chloride. The resulting thick heavy oil was separated by decantation and dissolved in dry acetone. On scratching and cooling this solution a dense white precipitate appeared. Several recrystallizations from isopropanol gave 55.7 g. (39%) of 3-(2-methyl-1-piperidyl)propyl 4-nitro-2-hydroxybenzoate hydrochloride, crystallizing in needles, M. P. 173.0–173.8° C. (corr.).

The third variant for preparing the tertiary-aminoalkyl 4-nitro-2-hydroxybenzoates is illustrated as follows: A mixture of one mole of 4-nitro-2-hydroxybenzoic acid and three moles of ethylene chlorohydrin was heated to reflux and dry hydrogen chloride was passed into the reaction mixture for eight hours. The excess ethylene chlorohydrin was removed by distilling in vacuo and the residue when crystallized from absolute ethanol yielded 2-chloroethyl 4-nitro-2-hydroxybenzoate, M. P. 87.4–88.4° C. (corr.). The corresponding 2-bromoethyl ester, M. P. 74.7–74.9° C. (corr.), resulted when ethylene bromohydrin was used in place of ethylene chlorohydrin. A mixture of one mole of 2-chloroethyl (or 2-bromoethyl) 4-nitro-2-hydroxybenzoate and two moles of diethylamine and 1500 ml. of toluene was refluxed for twenty-four hours. After removal of the solvent by distilling in vacuo, the residue was dissolved in hydrochloric acid, the acidic solution was treated with decolorizing charcoal and filtered. The filtrate was made alkaline with potassium carbonate and the mixture was extracted with ethyl acetate. After removal of the ethyl acetate by distilling in vacuo, the residue was dissolved in absolute ethanol and the alcoholic solution was treated with excess hydrogen chloride in ether. Addition of excess ether precipitated the basic ester salt, 2-diethylaminoethyl 4-nitro-2-hydroxybenzoate hydrochloride, which was recrystallized from isopropanol.

Other tertiary-aminoalkyl 4-nitro-2-hydroxybenzoate hydrochlorides prepared according to the foregoing procedures include those given in Table A.

TABLE A

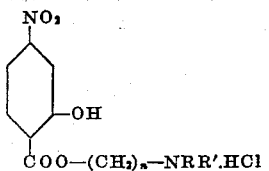

COO—(CH₂)ₙ—NRR'.HCl

| n | NRR' | M. P./° C. (corr.) |
|---|------|--------|
| 2 | N(CH₃)₂ | 174.0–175.0 |
| 2 | NC₅H₁₀ª | 183.8–184.8 |
| 2 | NC₆H₁₂ᵇ | 181.5–182.2 |
| 2 | NC₇H₁₄ᶜ | 181.5–182.1 |
| 3 | NC₅H₁₀ª | 183.0–184.0 |
| 2 | NC₄H₈Oᵈ | 195.2–197.6 |
| 3 | NC₄H₈Oᵈ | 210.0–210.6 |

ª NC₅H₁₀=1-piperidyl.
ᵇ NC₆H₁₂=2-methyl-1-piperidyl.
ᶜ NC₇H₁₄=2,6-dimethyl-1-piperidyl.
ᵈ NC₄H₈O=4-morpholinyl.

Additional tertiary-aminoalkyl 4-nitro-2-hydroxybenzoate hydrochlorides which can be prepared according to the above procedures include the following: 4-dimethylaminobutyl 4-nitro-2-hydroxybenzoate hydrochloride; 3-dimethylamino-2-propyl 4-nitro-2-hydroxybenzoate hydrochloride; 2-di-n-butylaminoethyl 4-nitro-2-hydroxybenzoate hydrochloride; 2-di-n-hexylaminoethyl 4-nitro-2-hydroxybenzoate hydrochloride; 4-(1-piperidyl)butyl 4-nitro-2-hydroxybenzoate hydrochloride; 2-(1-pyrrolidyl)ethyl 4-nitro-2-hydroxybenzoate hydrochloride; 3-(2-methyl-1-pyrrolidyl)propyl 4-nitro-2-hydroxybenzoate hydrochloride; and 2-(2,5-dimethyl-1-pyrrolidyl)ethyl 4-nitro-2-hydroxybenzoate hydrochloride.

The corresponding free bases of the foregoing salts, i. e., the tertiary-aminoalkyl 4-nitro-2-hydroxybenzoates, are highly-colored, high melting solids soluble in polar solvents such as water, methanol, ethanol, etc. and insoluble in non-polar solvents. They probably have the structure of inner salts, with the formula

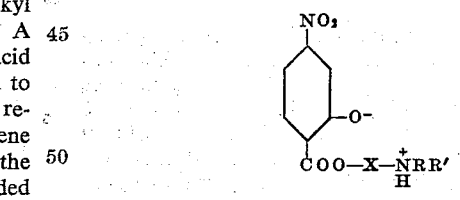

(2) *Tertiary-aminoalkyl 4 - amino - 2 - hydroxybenzoates*

These esters are prepared by reducing the hereinabove described tertiary-aminoalkyl 4-nitro-2-hydroxybenzoates. This reduction is carried out either by chemical means or by catalytic hydrogenation methods.

Exemplary of the chemical method is the following preparation of 2-(2,6-dimethyl-1-piperidyl)ethy 4-amino-2-hydroxybenzoate: To a stirred boiling mixture of 90 g. of iron powder, 200 ml. of water, 300 ml. of ethanol and 1 ml. of concentrated hydrochloric acid was gradually added in portions 80.7 g. of 2-(2,6-dimethyl-1-piperidyl)-ethyl 2-hydroxy-4-nitrobenzoate hydrochloride. Each addition produced an exothermic recation. When the addition had been completed, the mixture was stirred at the boiling point for twenty minutes. While continuing stirring and heating, 30 to 40 g. of solid sodium bicarbonate was cautiously added, and the resulting mixture was stirred and heated an additional ten minutes. The mixture was filtered hot and the filter cake washed well with hot ethanol. The combined filtrates were concentrated in vacuo until all ethanol was removed. The residual aqueous suspension of the crystalline base was cooled and filtered, and the precipitate was washed well with cold water. The precipitate crystallized from n-heptane in rosettes of beautiful long slender needles of 2-(2,6-dimethyl 1-piperidyl)ethyl 4-amino-2-hydroxybenzoate, M. P. 111.0–111.6° C. (corr.). The phosphate of this basic ester was prepared from mole equivalents of base and phosphoric acid ($H_3PO_4$) in absolute ethanol and recrystallized by dissolving in a minimum amount of hot water, filtering and slowly diluting with hot absolute ethanol. The resulting salt, 2-(2,6-dimethyl-1-piperidyl)ethyl 4-amino-2-hydroxybenzoate phosphate, melts at 197.7–200.0° C. (corr.).

A specific illustration of the catalytic hydrogenation method of preparing our tertiary-aminoalkyl 4-amino-2-hydroxybenzoates is the following synthesis of 3-(1-piperidyl)propyl 4-amino-2-hydroxybenzoate: A mixture of 10.0 g. of 3-(1-piperidyl)propyl 4-nitro-2-hydroxybenzoate hydrochloride, 500 mg. of platinum oxide and 150 ml. of 50% aqueous ethanol was hydrogenated in a Parr-Burgess hydrogenator at 25–45° C. and 20–50 lbs. pressure. The theoretical amount of hydrogen was absorbed in fifteen to twenty minutes. The mixture was filtered and evaporated to dryness in vacuo. The residual white solid was crystallized from ethanol to give a high yield of 3-(1-piperidyl)propyl 4-amino-2-hydroxybenzoate hydrochloride, M. P. 239.5–240.2° C. (corr.). The phosphate salt of this basic ester was prepared as follows: 3-(1-piperidyl)propyl 4-amino-2-hydroxybenzoate hydrochloride was converted to the crystalline base by treatment of an aqueous solution thereof with an excess of sodium carbonate solution. The resulting base when treated with a one mole proportion of 85% phosphoric acid in absolute alcohol solution readily yielded 3-(1-piperdyl)-propyl 4-amino-2-hydroxybenzoate phosphate, forming rosettes of large blunt needles from 95% ethanol, M. P. 204.7–205.0° C. (dec.) (corr.).

Other tertiary-aminoalkyl 4-amino-2-hydroxybenzoates prepared according to the above procedures include those given in Table B.

TABLE B

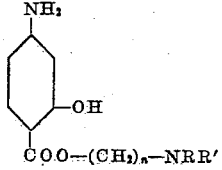

| $n$ | NRR′ | M. P./° C. (corr.) | |
|---|---|---|---|
| | | Base | Phosphate |
| 2 | $N(CH_3)_2$ | 136.1–137.2 | 219.7–220.0 [e], [f] |
| 2 | $N(C_2H_5)_2$ | oil | 154.0–154.8 [g] |
| 2 | $NC_5H_{10}$ [a] | 79.0–80.6 | 223.5–223.8 [e] |
| 2 | $NC_6H_{12}$ [b] | 60.0–62.0 | 203.5–204.0 |
| 3 | $N(CH_3)_2$ | oil | 209.6–210.7 [e] |
| (c) | $N(CH_3)_2$ | 111.6–113.2 | 203.2–204.2 [e] |
| 3 | $NC_6H_{12}$ [b] | oil | 201.0–201.5 |
| 2 | $NC_4H_8O$ [d] | 64.2–65.6 [h] | 200.7–201.2 |
| 3 | $NC_4H_8O$ [d] | 146.4 | 185.2–186.7 |
| 3 | $N(C_2H_5)_2$ | oil | 212.3 [e] |

[a] $NC_5H_{10}$ = 1-piperidyl.
[b] $NC_6H_{12}$ = 2-methyl-1-piperidyl.
[c] Tertiary-aminoalkyl is $-CH(CH_3)CH_2N(CH_3)_2$ or 3-dimethylamino-2-propyl.
[d] $NC_4H_8O$ = 4-morpholinyl.
[e] With decomposition.
[f] Monohydrochloride melts at 225.0–225.5° C. (corr.).
[g] Monohydrochloride.
[h] Crystallized from dilute ethanol as the monohydrate, M. P. 87–90° C.

Additional tertiary-aminoalkyl 4-amino-2-hydroxybenzoates which can be prepared according to the above procedures include the following: 4-dimethylaminobutyl 4-amino-2-hydroxybenzoate; 2-di-n-butylaminoethyl 4-amino-2-hydroxybenzoate; 2-di-n-hexylaminoethyl 4-amino-2-hydroxybenzoate; 4-(1-piperidyl)butyl 4-amino-2-hydroxybenzoate; 2-(1-pyrrolidyl)ethyl 4-amino-2-hydroxybenzoate; 3-(2-methyl-1-pyrrolidyl)propyl 4-amino-2-hydroxybenzoate; and 2-(2,5-dimethyl-1-pyrrolidyl)-ethyl 4-amino-2-hydroxybenzoate.

The foregoing tertiary-aminoalkyl 4-amino-2-hydroxybenzoates are also conveniently prepared from 4-nitro-2-hydroxybenzoic acid or its lower alkyl esters through the 2-benzyloxy derivatives according to the steps illustrated in the following equations, wherein R″ is a lower alkyl group and X and NRR′ have the meanings given hereinabove:

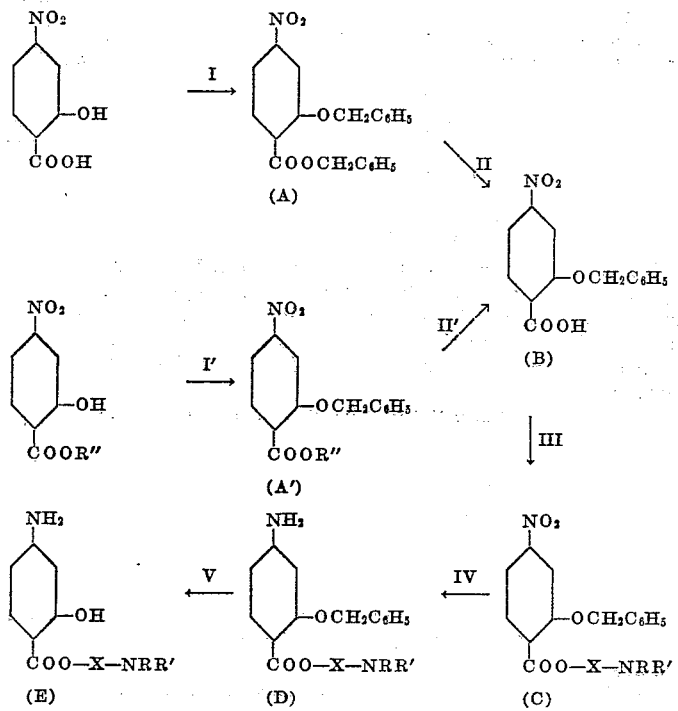

Thus, 4-nitro-2-benzyloxybenzoic acid (B) is prepared either by benzylating 4-nitro-2-hydroxybenzoic acid (step I) to form benzyl 4-nitro-2-benzyloxybenzoate (A), which is saponified in step II to yield the desired 4-nitro-2-benzyloxybenzoic acid or by benzylating a lower alkyl 4-nitro-2-hydroxybenzoate (step I′) to form a lower alkyl 4-nitro-2-benzyloxybenzoate (A′), which in step II′ is saponified to the desired acid (B). 4-nitro-2-benzyloxybenzoic acid is then esterified in step III to produce the corresponding tertiary-aminoalkyl 4-nitro-2-benzyloxybenzoate (C) which in step IV is reduced to the corresponding tertiary-aminoalkyl 4-amino-2-benzyloxybenzoate (D). Then, in step V, the tertiary-aminoalkyl 4-amino-2-hydroxybenzoate (E) is produced by catalytically debenzylating the basic 4-amino-2-benzyloxybenzoate (D). Steps IV and V can be carried out in the same reaction vessel without isolating compound D when the reduction is carried out catalytically, e. g. as with palladium on charcoal. As a specific illustration of steps III, IV and V, 4-nitro-2-benzyloxybenzoic acid is esterified to produce 3-(2-methyl-1-piperidyl)propyl 4-nitro-2-benzyloxybenzoate which is then reduced to the corresponding 3-(2-methyl-1-piperidyl)propyl 4-amino-2-benzyloxybenzoate, which, in turn, is reduced to 3-(2-methyl-1-piperidyl)propyl 4-amino-2-hydroxybenzoate.

We carried out esterification step III by two variants: in one, the 4-nitro-2-benzyloxybenzoic acid was reacted with a tertiary-aminoalkyl halide; and in the other, said acid was first converted into the corresponding acid chloride which was then treated with a tertiary-aminoalkanol. The reduction step IV was carried out both by chemical methods and by catalytic hydrogenation. Suitable chemical reducing agents include iron and hydrochloric acid, ferrous sulfate, tin and hydrochloric acid, etc. We found iron and hydrochloric acid was to be preferred. Catalysts suitable when catalytic hydrogenation was employed include Raney nickel, platinum, palladium etc. Reduction step V was carried out by catalytic hydrogenation, using preferably palladium, although platinum and Raney nickel can be used, the latter at higher temperatures and pressures.

The tertiary-aminoalkyl 4-amino-2-benzyloxybenzoates (D) and the process (step V) of converting them into the corresponding 4-amino-2-hydroxybenzoates are disclosed and claimed in our copending application Serial Number 242,421, filed August 17, 1951, now Patent No. 2,662,888.

We claim:

1. A member of the group consisting of a basic ester having the formula

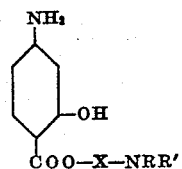

where NRR' is a tertiary-amino radical selected from the group consisting of lower dialkylamino, 1-piperidyl (lower alkylated)-1-piperidyl, 1-pyrrolidyl, (lower alkylated)-1-pyrrolidyl and 4-morpholinyl and X is a lower alkylene radical having 2–4 carbon atoms, and acid-addition salts thereof.

2. An acid-addition salt of a basic ester having the formula

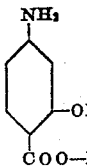

where X is a lower alkylene radical having 2–4 carbon atoms.

3. An acid-addition salt of a basic ester having the formula

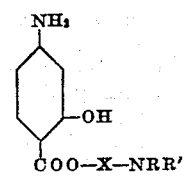

where X is a lower alkylene radical having 2–4 carbon atoms and NRR' is a (lower alkylated)-1-piperidyl radical.

4. An acid-addition salt of a basic ester having the formula

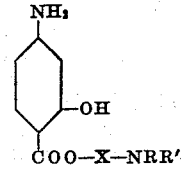

where X is a lower alkylene radical having 2–4 carbon atoms and NRR' is a 1-piperidyl radical.

5. An acid-addition salt of 2-dimethylaminoethyl 4-amino-2-hydroxybenzoate.

6. An acid-addition salt of 3-(2-methyl-1-piperidyl)-propyl 4-amino-2-hydroxybenzoate.

7. An acid addition salt of 2-diethylaminoethyl 4-amino-2-hydroxybenzoate.

8. An acid-addition salt of 3-diethylaminopropyl 4-amino-2-hydroxybenzoate.

9. An acid-addition salt of 3-(1-piperidyl)propyl 4-amino-2-hydroxybenzoate.

10. A process of preparting a basic ester having the formula

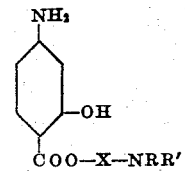

where NRR' is a tertiary-amino radical selected from the group consisting of lower dialkylamino, 1-piperidyl, (lower alkylated)-1-piperidyl, 1-pyrrolidyl, (lower alkylated)-1-pyrrolidyl and 4-morpholinyl and where X is a lower alkylene radical having 2–4 carbon atoms, which comprises reacting 4-nitro-2-hydroxybenzoic acid with a tertiary-aminoalkyl halide having the formula

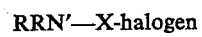

RRN'—X-halogen and reducing the nitro group of the resulting tertiary-aminoalkyl 4-nitro-2-hydroxybenzoate.

11. A process of preparing a basic ester having the formula

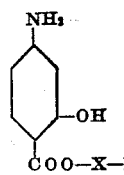

where X is a lower alkylene radical having 2–4 carbon atoms, which comprises reacting 4-nitro-2-hydroxybenzoic acid with a tertiary-aminoalkyl halide having the formula (Lower alkyl)₂N—X-halogen

and reducing the nitro group of the resulting dialkyl-aminoalkyl 4-nitro-2-hydroxybenzoate.

12. A process of preparing a basic ester having the formula

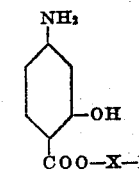

where X is a lower alkylene radical having 2–4 carbon atoms and NRR' is a (lower alkylated)-1-piperidyl radical, which comprises reacting 4-nitro-2-hydroxybenzoic acid with a tertiary-aminoalkyl halide having the formula RR'N—X-halogen

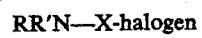

and reducing the nitro group of the resulting tertiary-aminoalkyl 4-nitro-2-hydroxybenzoate.

13. A process of preparing a basic ester having the formula

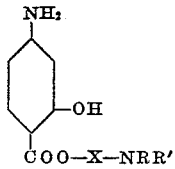

where X is a lower alkylene radical having 2–4 carbon atoms and NRR' is a 1-piperidyl radical, which comprises reacting 4-nitro-2-hydroxybenzoic acid with a tertiary-aminoalkyl halide having the formula RR'N—X-halogen and reducing the nitro group of the resulting tertiary-aminoalkyl 4-nitro-2-hydroxybenzoate 14. A process of preparing 2-dimethylaminoethyl 4-amino-2-hydroxybenzoate which comprises reacting 4-nitro-2-hydroxybenzoic acid with a 2-dimethylaminoethyl halide and reducing the nitro group of the resulting 2-dimethylaminoethyl 4-nitro-2-hydroxybenzoate.

15. A process of preparing 3-(2-methyl-1-piperidyl)-propyl 4-amino-2-hydroxybenzoate which comprises reacting 4-nitro-2-hydroxybenzoic acid with a 3-(2-methyl-1-piperidyl)propyl halide and reducing the nitro group of the resulting 3-(2-methyl-1-piperidyl)propyl 4-nitro-2-hydroxybenzoate.

16. A process of preparing 2-diethylaminoethyl 4-amino-2-hydroxybenzoate which comprises reacting 4-nitro-2-hydroxybenzoic acid with a 2-diethylaminoethyl halide and reducing the nitro group of the resulting 2-diethylaminoethyl 4-nitro-2-hydroxybenzoate.

17. A process of preparing 3-diethylaminopropyl 4-amino-2-hydroxybenzoate which comprises reacting 4-nitro-2-hydroxybenzoic acid with a 3-diethylaminopropyl halide and reducing the nitro group of the resulting 3-diethylaminopropyl 4-nitro-2-hydroxybenzoate.

18. A process of preparing 3-(1-piperidyl)propyl 4-amino-2-hydroxybenzoate which comprises reacting 4-nitro-2-hydroxybenzoic acid with a 3-(1-piperidyl)propyl halide and reducing the nitro group of the resulting 3-(1-piperidyl)propyl 4-nitro-2-hydroxybenzoate.

19. 2-dimethylaminoethyl 4-amino-2-hydroxybenzoate monohydrochloride.

20. 2-diethylaminoethyl 4-amino-2-hydroxybenzoate monohydrochloride.

References Cited in the file of this patent

UNITED STATES PATENTS 2,376,860    Blicke _____ May 29, 1945

FOREIGN PATENTS 317,296    Great Britain _____ Oct. 16, 1930